(12) United States Patent
Loda

(10) Patent No.: US 7,715,943 B2
(45) Date of Patent: May 11, 2010

(54) MICROSERVER FOR MANAGING AN ASSEMBLY OR REPAIR OF A PRODUCT

(75) Inventor: David C. Loda, Bolton, CT (US)

(73) Assignee: United Technologies Corporation, Hartford, CT (US)

( * ) Notice: Subject to any disclaimer, the term of this patent is extended or adjusted under 35 U.S.C. 154(b) by 236 days.

(21) Appl. No.: 12/075,057

(22) Filed: Mar. 7, 2008

(65) Prior Publication Data
US 2009/0228133 A1 Sep. 10, 2009

(51) Int. Cl.
G06F 7/00 (2006.01)
G06F 19/00 (2006.01)
G06F 17/00 (2006.01)
G06F 15/16 (2006.01)
G06F 15/173 (2006.01)
G08B 1/08 (2006.01)
G08B 23/00 (2006.01)
G08B 21/00 (2006.01)
G08G 1/00 (2006.01)
G08G 3/00 (2006.01)
G08G 1/123 (2006.01)

(52) U.S. Cl. .................. 700/229; 700/96; 700/113; 700/116; 700/225; 701/2; 709/203; 709/224; 340/425.5; 340/533; 340/539.1; 340/568.5; 340/693.12; 340/904; 340/945; 340/984; 340/989

(58) Field of Classification Search .............. 700/95, 700/96, 106, 112, 113, 115, 116, 213, 225, 700/228, 229; 701/2, 29, 32; 705/1, 7–9, 705/28, 29; 709/201, 203, 224, 249; 340/425.5, 340/500, 531, 533, 539.1, 540, 568.1, 568.5, 340/572.1, 572.8, 693.5, 693.9, 693.12, 901, 340/904, 945, 984, 988, 989
See application file for complete search history.

(56) References Cited

U.S. PATENT DOCUMENTS 6,112,246 A * 8/2000 Horbal et al. ............... 709/230

(Continued)

FOREIGN PATENT DOCUMENTS

| JP | 2002203147 A | * | 7/2002 |
| JP | 2005157533 A | * | 6/2005 |
| WO | 2006125014 A2 | | 11/2006 |
| WO | 2007055720 A2 | | 5/2007 |

OTHER PUBLICATIONS

Tang et al., "Networked Manufacturing-Based Supply Chain Operation Mode and Contract Research," 4th International Conference on Wireless Communications, Networking and Mobile Computing, Oct. 12-14, 2008, pp. 1-4.*

Jin et al., "Research of Embedded Motion Controller for Construction Machinery," Fifth IEEE International Symposium on Embedded Computing, Oct. 6-8, 2008, pp. 201-206.*

(Continued)

*Primary Examiner*—Crystal J Barnes-Bullock
(74) *Attorney, Agent, or Firm*—Kinney & Lange, P.A.

(57) ABSTRACT

A method and system for managing a product during assembly or repair of the product includes use of a microserver configured to function as a local computing workstation and collect, store and process data for the product throughout the assembly or repair process. The microserver may be carried by a support structure that supports the product through the assembly or repair process. The product data and other information relevant to the assembly or repair process are stored on the microserver and may be accessed by other computing devices, both local and remote to the product. The information is updated on the microserver as it happens. Thus, users are able to track a status of the product in real-time. The microserver enables two-way communication such that the other computing devices may also send information to the microserver.

20 Claims, 3 Drawing Sheets

U.S. PATENT DOCUMENTS

| | | | |
|---|---|---|---|
| 6,438,468 B1 * | 8/2002 | Muxlow et al. | 701/3 |
| 6,684,119 B2 * | 1/2004 | Burnard et al. | 700/106 |
| 6,912,580 B1 * | 6/2005 | Kanevsky et al. | 709/228 |
| 7,018,106 B2 * | 3/2006 | Okada | 384/448 |
| 7,035,877 B2 | 4/2006 | Markham et al. | |
| 7,127,307 B2 * | 10/2006 | Sasaki et al. | 700/96 |
| 7,167,788 B2 | 1/2007 | Loda et al. | |
| 7,171,295 B2 * | 1/2007 | Furuno et al. | 701/50 |
| 7,246,003 B2 | 7/2007 | Loda et al. | |
| 7,251,554 B2 | 7/2007 | Loda et al. | |
| 7,443,282 B2 * | 10/2008 | Tu et al. | 340/10.1 |
| 7,484,008 B1 | 1/2009 | Gelvin et al. | 709/249 |
| 7,518,511 B1 * | 4/2009 | Panja et al. | 340/572.1 |
| 2002/0095491 A1 * | 7/2002 | Edmonds et al. | 709/224 |
| 2003/0033260 A1 * | 2/2003 | Yashiro et al. | 705/400 |
| 2003/0105565 A1 | 6/2003 | Loda et al. | |
| 2003/0163591 A1 | 8/2003 | Loda | |
| 2003/0195790 A1 * | 10/2003 | Wepfer et al. | 705/9 |
| 2003/0236821 A1 * | 12/2003 | Jiau | 709/203 |
| 2004/0054788 A1 * | 3/2004 | Ouchi | 709/229 |
| 2004/0206818 A1 | 10/2004 | Loda et al. | |
| 2005/0027826 A1 | 2/2005 | Loda et al. | |
| 2005/0165534 A1 | 7/2005 | Loda et al. | |
| 2005/0228528 A1 * | 10/2005 | Farchmin et al. | 700/116 |
| 2006/0015777 A1 | 1/2006 | Loda | |
| 2006/0129462 A1 | 6/2006 | Pankl et al. | |
| 2006/0149407 A1 | 7/2006 | Markham et al. | |
| 2006/0163350 A1 * | 7/2006 | Melton et al. | 235/435 |
| 2006/0164239 A1 | 7/2006 | Loda | |
| 2006/0168090 A1 | 7/2006 | Loda et al. | |
| 2006/0250248 A1 | 11/2006 | Tu et al. | |
| 2007/0180674 A1 * | 8/2007 | Morden et al. | 29/407.01 |
| 2007/0213860 A1 * | 9/2007 | McGushion | 700/95 |
| 2008/0126111 A1 * | 5/2008 | Loda | 705/1 |
| 2009/0125367 A1 * | 5/2009 | Brink et al. | 705/9 |

OTHER PUBLICATIONS

Deb et al., "Remote Diagnosis Server," The 19th Proceedings on Digital Avionics Systems Conferences, vol. 2, Oct. 7-13, 2000, pp. 6B2/1-6B2/8.*

Cole et al., "High speed digital transceivers: A challenge for manufacturing," International Proceedings on Test Conference, Sep. 28-30, 1999, pp. 211-215.*

* cited by examiner

MICROSERVER FOR MANAGING AN ASSEMBLY OR REPAIR OF A PRODUCT

BACKGROUND

The present invention relates to a method and system of managing a product during assembly or repair of the product. More specifically, the present invention relates to a microserver attachable to a support structure that supports the product during the assembly or repair process, and configured to gather, store and communicate data about the product.

Assembly of a complex product, such as a vehicle, commonly takes place in a factory made up of multiple work cells. This same type of assembly process may also apply to the main components of the vehicle, such as, for example, an engine of the vehicle. As the vehicle moves through the work cells in the factory, various parts from the factory are added to the vehicle. Tracking systems are used to monitor the location of the parts and to update that parts have been removed from inventory and been integrated into the vehicle. At various stages of the assembly, instruction manuals (paper or electronic) are also used to guide assembly. Throughout the assembly process, assembly checklists and documentation are maintained to ensure quality and completeness. This is particularly important for highly regulated industries, such as, for example, the aviation industry.

This type of assembly process commonly utilizes factory networks and manufacturing software for completing the activities outlined above. However, as the vehicle moves from work cell to work cell, it is necessary to log into computers dedicated to each work cell to access and input information pertinent to assembly activities in that work cell. The accessed information may come from numerous databases and systems within the factory network. Moreover, tracking of parts and inventory is commonly done using a separate set of databases and tracking methods. Without being physically present in a work cell, the factory network may have limited capabilities in terms of providing users real-time updates on the status of a product during assembly.

For many products (for example, an aircraft engine), a repair process may follow a procedure similar to the assembly process described above. The product may be sent to a repair facility and pass through multiple work cells in the facility as part of the repair process. Parts from inventory may be used to replace damaged parts. Repair manuals may be used to facilitate the repair, and checklists may commonly be required. The challenges described above for managing a product during assembly also apply to managing the repair of a product.

There is a need for an improved system to gather, store, and update information about a product as the product is being assembled or repaired, such that the information is available in one location and accessible locally and remotely from the product.

SUMMARY

A method and system is described herein for managing a product during assembly or repair of the product. During an assembly or repair of a large and/or complex product, the product is commonly supported and transported on a support structure throughout the assembly or repair process. The support structure may include a microserver configured to function as local computing workstation and collect, store and process data for the product. All information relevant to the assembly or repair process may be stored on the microserver. The microserver enables two-way communication between the microserver and other computing devices, both local and remote.

In an exemplary embodiment, the product may be an aircraft engine that is being assembled on an engine cart or a build stand. Assembly of the engine may occur in multiple work cells located in a single factory or work cells spread out among multiple buildings or geographic locations. Multiple users, both local and remote to the assembly process, may send information to and receive information from the engine microserver. In some embodiments, a work cell may include a microserver dedicated to that work cell. In that case, the work cell microserver is able to communicate with the engine microserver locally and remotely. The engine microserver may also communicate with a microserver for an aircraft that the engine is to be assembled onto. The system described herein allows the engine microserver and the aircraft microserver to communicate and share data, even when they are in different geographic locations.

DETAILED DESCRIPTION

A net-centric product management system is described herein for managing a product during assembly or repair of the product. For larger products, such as a vehicle or a component of a vehicle (i.e. an engine), the product is commonly assembled on some type of movable support structure, such as a build stand, a cart or a platform. The net-centric product management system includes a microserver that is configured to be attached to or carried by the support structure and function as a local computing workstation. The microserver gathers, stores and processes data relevant to the product. The microserver creates a local world wide web around the support structure, and is able to communicate with local and remote computing devices about the product.

A microserver system may be used to create a network centric architecture for a product. For example, an onboard microserver system may be used to manage operation of a vehicle, such as an aircraft. The onboard microserver system allows data to be collected, stored and/or processed for the various subsystem components of the aircraft. The data may be converted into usable knowledge that is made available to selected users, such as maintenance personnel, suppliers and airline operators. Communications to and from the onboard microserver system, including a transfer of data, may be made locally and remotely using known communication means, including, but not limited to, satellite, cellular, wireless LAN, radio, and cable. A microserver system for a deployed product is disclosed in U.S. Patent Application Pub. No. US 2003/0105565, which is assigned to United Technologies Corporation, the assignee of this application.

The microserver system used to manage operation of an aircraft may be used to manage assembly or repair of a product. The microserver may function as a central repository for all information relevant to the product. A complete history of the product may be created and maintained on the microserver. A second copy of the information may be stored in another database. In preferred embodiments, once the assembly of the product is complete, all information may be transferred from the microserver to an archive database.

Figure 1:
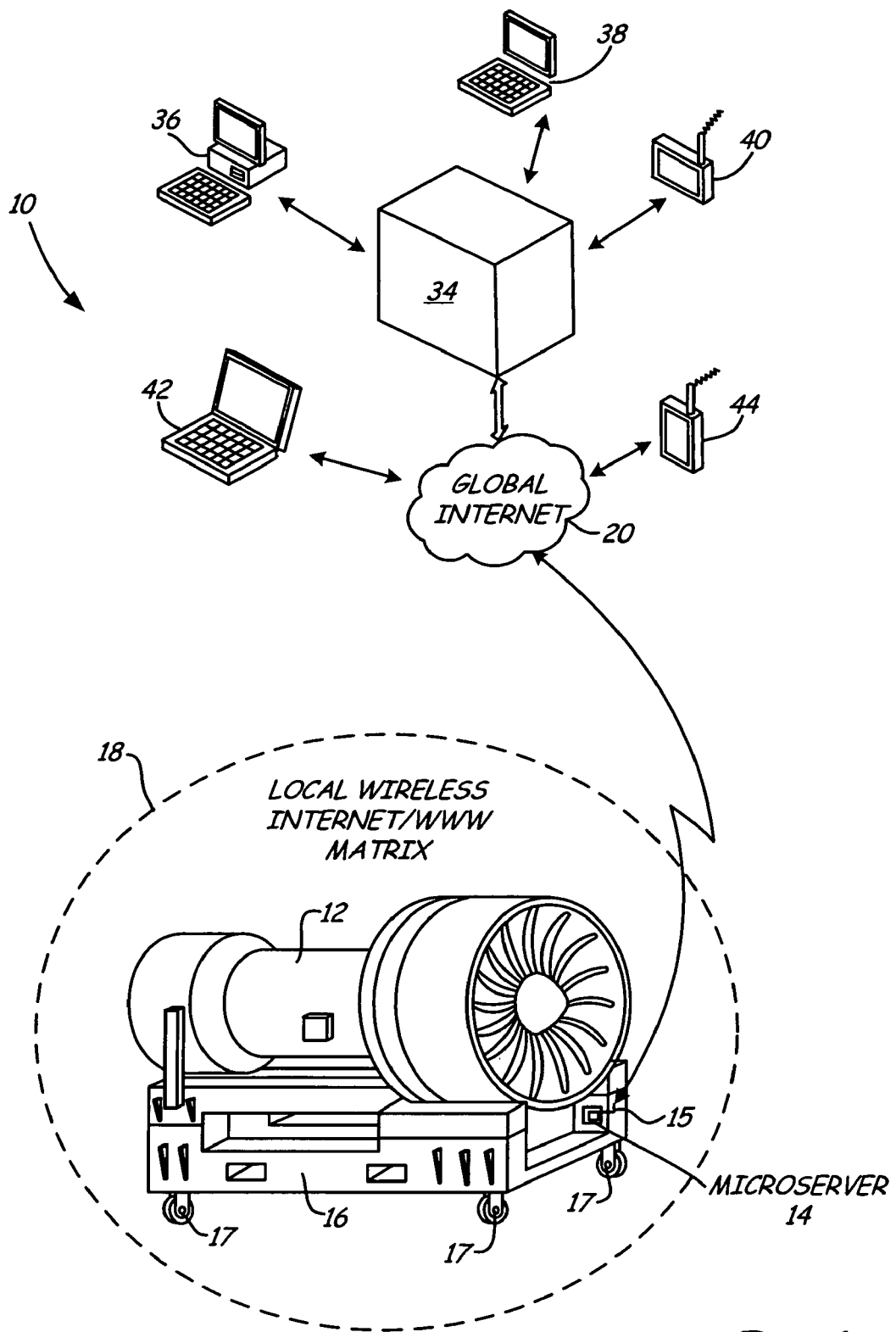
FIG. 1 is a schematic of a microserver system of the present invention for managing an assembly of an aircraft engine.

FIG. 1 is a schematic of microserver system 10 for use in an assembly process of aircraft engine 12, which may be a gas turbine engine. System 10 includes microserver 14 which is mounted on engine build stand 16. Microserver 14 may be configured as a web-based server and a computer processor. Microserver 14 includes antenna 15, which generates a wireless system 18 (i.e. a local wireless Internet/world wide web (www) matrix) around stand 16 and engine 12. This makes it possible to have two-way wireless communication between microserver 14 and local computing devices located within wireless system 18. Microserver 14 may also have two-way wireless communication with a remote computing device through global Internet 20, as shown in FIG. 1. Microserver 14 may host its own web page that is dedicated to assembly of engine 12.

Due to a complexity of engine 12, assembly of engine 12 commonly occurs in multiple work cells within one building or more than one building of a factory. In some cases, engine 12 may be transported to another facility for a portion of the assembly. Because engine 12 is heavy and difficult to move, engine 12 is commonly assembled on some type of movable support structure, such as a build stand or cart, like stand 16 of FIG. 1. Thus, build stand 16, which includes rollers 17, is used to support and transport engine 12 as it moves from work cell to work cell, or from building to building. In some cases, engine 12 may be delivered to a customer on stand 16. In that situation, stand 16 would eventually be returned to the assembly facility.

Multiple sources of information are accessed, tracked and updated during assembly of engine 12. For example, a bill of materials (BOM) is used during assembly to ensure that all parts required in engine 12 are in fact integrated into engine 12. Inventory databases are also updated to reflect that parts are removed from inventory and added to engine 12. Assembly instructions and manuals may commonly be referenced during engine assembly. An important component of the engine assembly includes checklists confirming that necessary steps have been completed.

In existing designs, a factory for assembling engine 12 may include work cell computers that are connected to a factory network. In some cases, the bill of materials may be accessed and updated electronically on a work cell computer. However, the bill of materials and inventory information may be contained within distinct databases. Moreover, when engine 12 enters a work cell on stand 16, it is necessary to navigate through the network to obtain information specific to engine 12.

Microserver 14 may be used to store all of the information described above and more for assembly of engine 12. As the product is assembled, microserver 14 may be updated accordingly. Microserver 14 may be connected with the various databases used in the factory such that microserver 14 relays updated information to the databases. For example, when a part is removed from inventory and added to engine 12, microserver 14 communicates that information to the inventory database, as well as to other interested parties. Microserver 14 contains real time data on the status of engine 12. Assembly instructions for engine 12 may be stored on microserver 14 and accessed when needed. In preferred embodiments, three dimensional models of engine 12 are used in conjunction with the assembly instructions.

Data from microserver 14 may be accessed locally through local Internet/www matrix 18 or remotely through global Internet 20. As stated above, microserver 14 generates a local wireless network around stand 16 and engine 12. As such, any computing devices located within local Internet/www matrix 18 are able to access data from microserver 14, assuming any security requirements are satisfied. If engine 12 is contained within a work cell that contains a desktop computer, information from microserver 14 may be accessed through the local desktop computer. Other local computing devices, including, but not limited to, phones, tablets, laptop computers, and personal digital assistants (PDAs), may be used to access information from microserver 14.

Remote access to microserver 14 is possible due to two-way communication between wireless system 18 and global Internet 20. Portal 34, as shown in FIG. 1, may access data from microserver 14 through global Internet 20. Portal 34 functions as a central server that limits access to certain users. Data gathered by microserver 14 may be synchronized to portal 34 as desired. For example, microserver 14 may be programmed to periodically synchronize data to a server hosting portal 34 or to download data on specific events, such as when build stand 16 is moved from one work cell to another work cell. Portal 34 may also synchronize data to microserver 14. For example, as stated above, microserver 14 may contain assembly manuals and portal 34 may upload updates to the assembly manuals to microserver 14.

Multiple users may access portal 34 simultaneously. For example, in FIG. 1, computing devices 36 and 38, as well as cell phone 40, are shown as having wireless communication with portal 34. Alternatively, these devices could have a wired connection to portal 34. A personal digital assistant (PDA), as well as other types of computing devices, may similarly be used to access portal 34. Alternatively, computing devices, operated by multiple users, may access data from microserver 14 directly through global Internet 20. As shown in FIG. 1, computer 42 and cell phone 44 may connected to global Internet 20 in order to communicate with microserver 14.

As described below in reference to FIG. 3, remote users benefit from an ability to easily access data from microserver 14. For example, a customer that has purchased aircraft engine 12 may communicate with microserver 14 to determine when assembly of engine 12 may be completed. A user may access data from microserver 14 by simply logging onto the web page dedicated to microserver 14. For security purposes, microserver 14 may-be provided with a firewall and security protocols known only to selected individuals, or microserver 14 may utilize additional software or hardware encryption devices and operate as a private network.

Microserver 14 is configured to travel with build stand 16 through an assembly of engine 12. In the embodiment of FIG. 1, microserver 14 is mounted on build stand 16. Microserver 14 may be attached to build stand 16 using any known attachment method. In preferred embodiments, microserver 14 is configured to be removable from build stand 16, for example, if service or trouble shooting of microserver 14 is necessary. It is recognized that microserver 14 may be mounted in any location on stand 16. In preferred embodiments, microserver is located in an area on stand 16 where it is protected from damage that could potentially arise during assembly of engine 12.

Once assembly of engine 12 is complete, engine 12 may be delivered to a customer, which may be the builder of an aircraft for which engine 12 is designed. In that case, build stand 16 may remain with engine 12 during transport of engine 12 to the customer. In another embodiment, engine 12 may be removed form build stand 16 when engine 12 leaves the factory where engine 12 was assembled. At either point, engine 12 eventually is removed from build stand 16, and stand 16 may be re-used for assembly of another engine. In preferred embodiments, microserver 14 remains mounted to build stand 16 and the data stored on microserver 14 pertaining to engine 12 may be cleared prior to starting assembly of another engine. The data from microserver 14 for engine 12 may be transferred to an archive database. Moreover, some of the data from microserver 14 may be transferred to an onboard microserver used with engine 12 during flight operation. The onboard microserver may be dedicated to engine 12 or it may be an onboard microserver that serves all of the aircraft to which engine 12 is attached.

In alternative embodiments, microserver 14 may be removed from build stand 16 and remain dedicated to engine 12 throughout service of engine 12 on the aircraft. In that case, a new microserver would be attached to build stand 16 each time that a new engine is assembled. It is recognized, however, that a flight certified, onboard microserver to be used in engine operation may require more sophisticated software and programs compared to a microserver designed for use during engine assembly. As such, it is preferred that microservers configured for assembly remain in an assembly environment, and flight certified microservers be dedicated to operating engines.

Microserver 14 becomes the central repository for all information relevant to assembly of engine 12. Existing product management systems (for example, inventory databases) may still be used in parallel with microserver 14. However, instead of having information in various databases, all information relevant to engine 12 is contained in microserver 14.

Figure 2:
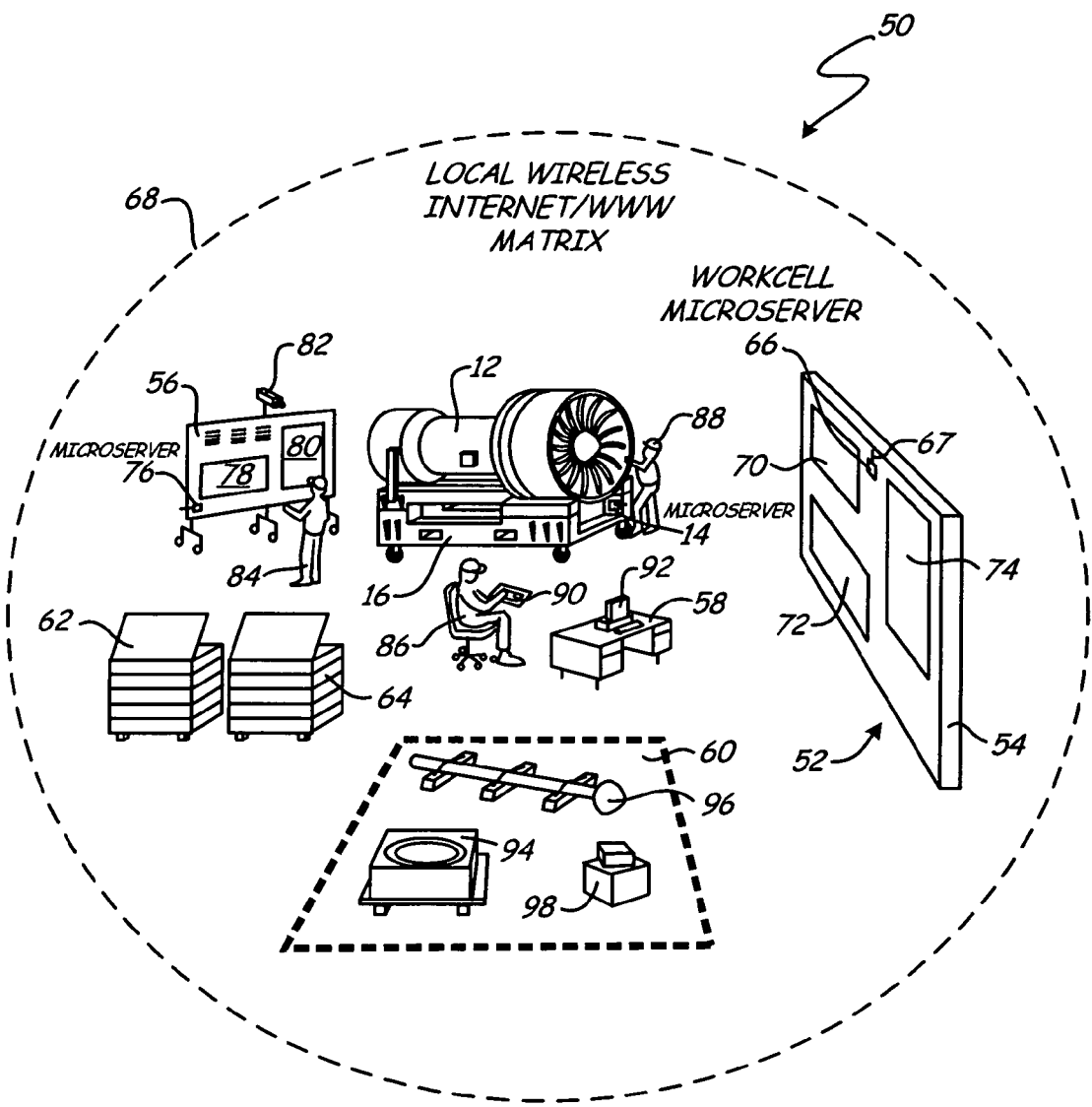
FIG. 2 is a schematic of the microserver system of FIG. 1 in a work cell of a factory to illustrate how the microserver system is used to manage assembly of the aircraft engine.

FIG. 2 shows engine 12 and build stand 16 of FIG. 1 in work cell 50 of a factory where engine 12 is assembled. The factory may contain one or more work cells that engine 12 is required to pass through to complete an assembly process. Work cell 50 is representative of a typical layout of a work cell for assembling an engine, and includes main communication area 52 on wall 54, mobile communication board 56, desk 58, parts receiving area 60, and tool carts 62 and 64.

In the exemplary embodiment shown in FIG. 2, work cell 50 includes work cell microserver 66, which is mounted to wall 54 of the main communication area 52. Work cell microserver 66 includes antenna 67, which generates a wireless system 68 (i.e. a local wireless Internet/world wide web (www) matrix) around work cell 50. Communication area 52 also includes plasma screens 70 and 72, and wipe board 74. Mobile collaboration board 56 may similarly include microserver 76, plasma screen 78, and wipe board 80, as well as camera 82. As shown in FIG. 2, work cell 50 includes first worker 84, second worker 86 and third worker 88. It is recognized that work cell 50 may contain more or less than three workers, and the number of workers assigned to work cell 50 may vary at any time.

When engine 12 enters work cell 50 on build stand 16, any of the local computing devices located within wireless system 68 may access data from microserver 14, assuming the devices have been granted access to microserver 14. As shown in FIG. 2, first worker 84 may access data locally from microserver 14 using tablet PC 90. Desktop computer 92 on desk 58 may also be used to locally communicate with microserver 14. Other wireless devices, such as a PDA, may be used in work cell 50 to communicate with and access data from microserver 14. Assembly instructions for engine 12 that are stored on microserver 14 may be displayed on any of plasma screens 70, 72 and 78. In preferred embodiments, the assembly instructions from microserver 14 may include a three-dimensional model of an assembled engine. In preferred embodiments, plasma screens 70, 72 and 78 may function as interactive touch screens. More than or less than three plasma screens may be contained within work cell 50. An alternative device, such as a projection screen, may be used to display information in work cell 50.

Using work cell microserver 66, parts to be assembled onto engine 12 in cell 60 may be ordered prior to entry of build stand 16 into work cell 50. Depending on an organization of the factory that contains work cell 50, ordering parts may include sending an electronic communication from microserver 66 to a factory warehouse that stores the parts until they are ready for assembly. Alternatively, an electronic notification may be sent to tablet PC 90 or desktop computer 92 from microserver 66 to alert workers 84, 86 and 88 to coordinate arrival of the parts in work cell 60. Microserver 14 may be designed such that a notification is sent to work cell microserver 66 once engine 12 reaches a certain point in its assembly upstream of work cell 50, in order to provide adequate time for the parts to be sent to work cell 50.

It is recognized that work cell microserver 66 is not required in work cell 50 since microserver 14 on build stand 16 also generates a local Internet/www matrix around work cell 50 when build stand 16 enters cell 50. Work cell microserver 66 may be used to communicate with microserver 14 prior to build stand 16 entering work cell 50. Assembly data from microserver 14 may be accessed by microserver 66 before engine 12 arrives in work cell 50, allowing work cell 50 to better prepare for engine assembly. Microserver 76 on mobile collaboration board 56 is also not required in work cell 50. In preferred embodiments, mobile collaboration board 56 is configured to be used in any of the work cells or other areas within the factory as needed. As such, it may be beneficial that board 56 have a dedicated microserver so that a local wireless system may be generated around board 56, regardless of its location.

In an alternative embodiment in which work cell microserver 66 and microserver 76 are not included in work cell 50, computing devices in work cell 50 (such as tablet PC 90 and desktop computer 92) may still access data remotely from microserver 14 through the global internet, as described in reference to FIG. 1. In that case, microserver 14 may send communications to tablet PC 90 and/or desktop computer 92, which may include, for example, instructions to obtain parts needed in work cell 50 at a certain time.

Even when microserver 14 is not located in work cell 50, microserver 14 is thus able to communicate with computing devices in work cell 50 and/or other microservers 66 and 76. Microserver 14 may send updates to the computing devices in work cell 50. For example, if assembly of engine 12 is delayed due to inactivity in a work cell upstream of work cell 50, microserver 14 may communicate this to work cell microserver 66 or directly to the computing devices inside work cell 50.

Microserver 14 may provide work cell 50 with a complete list of the parts and tools that will be required for that portion of the engine assembly that occurs in work cell 50. As described above, parts needed in work cell 50 may be ordered prior to arrival of engine 12 in work cell 50. Parts, such as parts 94, 96, and 98, as shown in FIG. 2, may then be placed in parts receiving area 60. Tool carts 62 and 64 may remain in work cell 50 at all times. Additional tools not in carts 62 and 64 may be ordered to work cell 50 as necessary. In some cases, pre-assembled kits may also be used in work cell 50. For example, a "shaft installation kit" may include a shaft to be assembled onto engine 12, along with corresponding fasteners and other components, as well as the tools required for installing the shaft. These types of kits may be ordered similarly to parts 94, 96 and 98, and placed in receiving area 60. The kits may also be tracked in the same manner as parts 94, 96 and 98.

Parts 94, 96 and 98 are commonly tracked using bar coding and/or radio frequency identification (RFID). In the case in which parts 94, 96, and 98 have bar codes, a bar code reader may be wirelessly connected to microserver 14. As an example, part 94 may be removed from parts receiving area 60 and prepared for integration into engine 12. When part 94 is read by the bar code reader, part 94 changes from having an inventory part number to having a serial number that matches with a serial number on the bill of materials. Microserver 14 receives the information from the bar code reader and automatically updates the bill of materials. Microserver 14 may then also disseminate the updated information on part 94 to the various other networks and databases used for tracking parts and inventory. For example, the information may be supplied to a factory inventory database and to a supply chain system.

In an alternative embodiment in which parts 94, 96 and 98 are RFID tagged, any of microservers 14, 66, and 76 may include RFID capabilities. Using microserver 14 as an example, once microserver 14 enters work cell 50, microserver 14 is able to identify all parts present in work cell 50 that are RFID tagged. Similarly, tools in tool carts 62 and 64 may also be RFID tagged. Microserver 14 may similarly identify if all tools required for assembly in work cell 50 are present.

Anything of value in work cell 50 (for example, plasma screens 70, 72, and 78) may be tracked using an RFID system in combination with microserver 14 and/or microservers 66 and 76. With an RFID system, microserver 14 may identify if anything of value is missing from work cell 50 prior to starting assembly in work cell 50. RFID tracking may also be used after assembly in work cell 50 is finished and tools have been returned to carts 62 and 64, but before stand 16 exits work cell 50. In some cases, tools, such as a wrench, have been left inside an-engine after assembly. Microserver 14 may be used to identify a location of the tools within work cell 50; thus, if all of the tools are not returned to carts 62 and 64, microserver 14 may issue an alert that one or more tools is unaccounted for. This may prevent a tool being inadvertently left inside engine 12.

As stated above, any or all of plasma screens 70, 72 and 78 may be touch screens with interactive capabilities. Assembly manuals and instructions may be displayed on screens 70, 72 and 78. Similarly, the bill of materials (BOM) for the engine assembly may also be displayed. When a part is added to engine 12, the BOM may be updated using the interactive plasma screen. Thus, the information is updated directly to microserver 14, which is wirelessly connected to the plasma screens. The updated information may then be disseminated from microserver 14 to one or more of the factory databases used for monitoring inventory and part information. Assembly checklists and/or quality control checklists may also be displayed on any of plasma screens 70, 72 and 78. As tasks are completed, workers 84, 86 or 88 may update the checklists stored on microserver 14 using screens 70, 72 and 78. The updated information may then be communicated from microserver 14 to other databases and/or to interested parties. All information about assembly of engine 12 is stored on microserver 14 and updated as it is happens. Thus, microserver 14 contains real-time data on the status of engine 12.

As shown in FIG. 2, mobile collaboration board 56 includes camera 82, which is wirelessly connected to microserver 76 on mobile collaboration board 56. Camera 82 may be used to provide real-time images of what is occurring in work cell 50. By remotely accessing microserver 76, through a web page dedicated to microserver 76, a user can view footage from camera 82. This may be used, for example, by plant personnel that are located in an office area of the factory. Camera 82 also may be used by remote users, for example, when issues are encountered during assembly. Security protocols may be used to limit access to footage from camera 82 to designated users. In some cases, access to camera 82 may be for a limited period. It is recognized that more than one camera may be contained within work cell 50.

For a factory that does not have microservers on the engine stands and in the work cells, the work cells may still commonly include computing devices, like PC tablet 90 and desktop computer 92. Bar coding and/or RFID may still be used as described above to track parts and update inventory as parts are assembled onto the engine. The work cell computing devices may be connected to the factory network and databases. However, without microserver 14, once the engine enters the work cell, it is necessary to log into the appropriate databases to gather information specific to that engine, including what parts are needed and any specific instructions. Moreover, it is also necessary to locate specific assembly instructions and/or manuals, either paper or electronic, which may be consulted through the assembly.

Without the microservers, before the engine gets to a work cell, the engine is tracked electronically using existing factory tracking systems. However, this requires accessing other database systems and the information may not reflect the real-time status of the engine within the factory. In addition, in a factory that does not include the microservers described above, it is more difficult to access assembly manuals and checklists. If paper copies are used, then it is important to ensure that the manuals and checklists are obtained prior to entry of the engine into the work cell, and that they correspond to the correct engine model. On the other hand, if electronic copies may be accessed on the computing devices within the work cell, it is still necessary to verify that the correct checklists and manuals are used. In both cases, it is necessary to verify that any updates are accounted for.

In contrast, using microserver 14 (alone or in combination with work cell microserver 66), all information relevant to assembly of engine 12 is stored on microserver 14. When engine 12 enters work cell 50, all information needed for assembly of engine 12 is automatically available. Any of this information may be displayed on any of plasma screens 70, 72 and 78, or the other computing devices within work cell 50. The information may include assembly instructions including three dimensional models of the assembled engine, a bill of materials, checklists and any special instructions. As activities are happening and completed within work cell 50, this information may automatically be added to microserver 14 or input by any of workers 84, 86 and 88. As described above, microserver 14 thus makes it easier to track the status of engine 12 in real-time. As information is updated on microserver 14, the information may easily be communicated through the factory network to other network databases and to other interested users, including users located within the factory and remote users. This is described further below in reference to FIG. 3.

A duplicate copy of the data stored on microserver 14 may be stored on a back-up server similar to portal 34 of FIG. 1. The back-up server and microserver 14 may be periodically synched together in order to copy data from microserver 14 to the back-up server. This synchronization may be performed periodically and/or upon the occurrence of specific events. For example, once assembly of engine 12 in work cell 50 is complete, data from microserver 14 may be synchronized to the back-up server before engine 12 and build stand 16 are transported to the next work cell.

Microserver 14 is able to send communications, both local and remote, to other computing devices and other network databases. In the same way, microserver 14 is also able to receive communications from local and remote computing devices. If it is determined, for example, that there was a problem with a series of parts from the warehouse, this could be communicated from the warehouse, or any other location, directly to microserver 14 to alert workers 84, 86 and 88 that the problematic series of parts should not be used in engine 12. When microserver 14 receives this information, it may automatically update the bill of materials and the assembly instructions in order to alert workers 84, 86 and 88 of the problematic parts.

Figure 3:
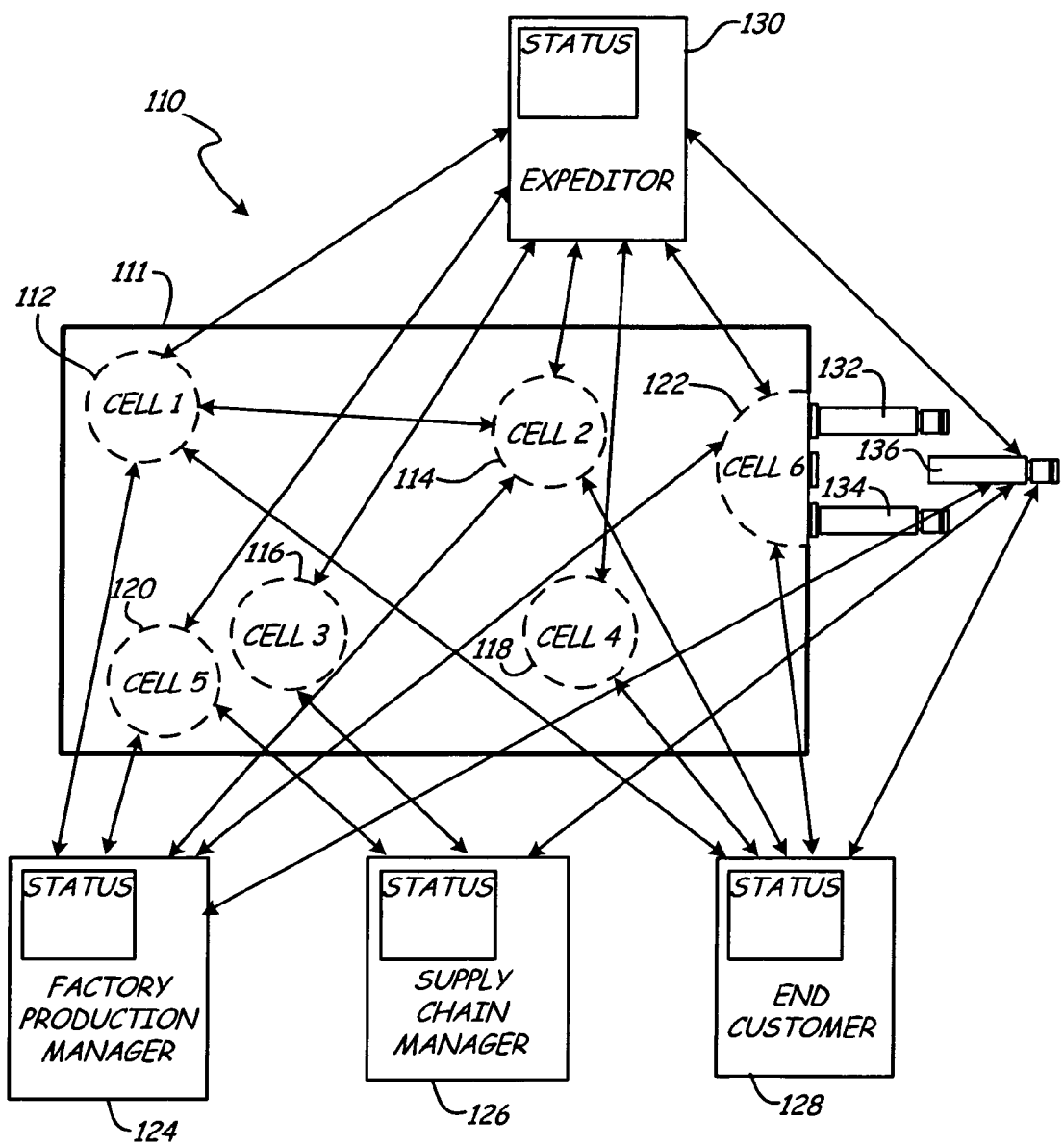
FIG. 3 is a schematic of a microserver system integrated into a factory having multiple work cells, and data from the work cells is accessed by multiple users.

FIG. 3 is a schematic of microserver system 110 integrated into factory 111, which includes multiple work cells 112, 114, 116, 118, 120 and 122. Information from each work cell is accessed by multiple users 124, 126, 128 and 130. As described further below, users 124, 126, and 130 may, in some cases, be located on-site, while user 128 may be located remote to factory 111.

In the exemplary embodiment of FIG. 3, factory 111 is used for assembly of aircraft engines and contains six work cells, each of which may be similar, in some ways, to work cell 50 of FIG. 2. It is recognized that more or less than six work cells may be contained within a factory. It is also recognized that complete assembly of the aircraft engines may not be contained within the building of factory 111 shown in FIG. 3. Additional work cells not shown in FIG. 3 may be contained within nearby buildings that are part of factory 111. Assembly of the engines may even include shipping the partially assembled engines to different geographic locations prior to or after assembly in factory 111.

In most cases, at a given time, more than one engine is being assembled or repaired in factory 111. As described above, each engine has its own stand or support structure that supports and transports that engine as the engine moves through the various work cells in factory 111. Microserver system 110 is designed such that each engine also has its own microserver attached to the support structure. In some embodiments, the work cells may also have a microserver dedicated to that work cell, similar to work cell microserver 66 of FIG. 2. However, in the exemplary embodiment shown in FIG. 3, factory 111 does not include work cell microservers. The microservers attached to the build stand create a local wireless system around each of the work cells, which include first work cell 112, second work cell 114, third work cell 116, fourth work cell 118, fifth work cell 120, and sixth work cell 122. Microserver system 110 not only allows multiple users to remotely track the real-time status of a product being assembled or repaired, but it also allows multiple products to be tracked simultaneously. As described further below, collective data from multiple microservers may be used to aid in improving the assembly process in factory 111.

Some of the users who may access data from the microservers in work cells 112, 114, 116, 118, 120, and 122 include, but are not limited to, factory production manager 124, supply chain manager 126, customer 128, and expediter 130. As described above, the microservers may be configured so that only designated users have access to the data on the microservers. Moreover, each user may have specific data rights unique to that user, such that some of the data may not be accessible to some users. For example, in preferred embodiments, customer 128 may have restricted access, whereas production manager 124, in most cases, may have unrestricted access to all data on the microservers within factory 111. It is recognized that other users not specifically shown in FIG. 3 may access data from the microservers in factory 111. Moreover, additional users may be granted access to the microservers at essentially any point in time. In some cases, users may be temporarily granted access to data from the microservers.

Users 124, 126, 128 and 130 are used as examples in FIG. 3 of users that may benefit from accessing data from the engine microservers carried on build stands located in factory 111. Factory production manager 124 may use micro server system 110, for example, to analyze overall efficiency levels within factory 111 and to compare production levels across work cells. Manager 124 may manage operation of the various work cells, as a function, in part, of forecasting and customer needs. Microserver system 110 allows manager 124 to manage and oversee operation within factory 111 without having to physically visit each work cell. For example, if production manager 124 is interested in knowing what is happening within first work cell 112, manager 124 may access the microserver associated with the engine being built in first work cell 112. In an embodiment in which first work cell 112 contained a camera wirelessly connected to a microserver in that work cell (similar to camera 82 of FIG. 2), manager 124 may watch from his or her desk what is happening in real-time in work cell 112.

Supply chain manager 126 is commonly located within factory 111. As similarly described in regard to factory production manager 124, microserver system 110 allows supply chain manager 126 the ability to view data on all of the engines within factory 111 either waiting to be assembled or in the process of being assembled. Manager 126 may also access the bill of materials and other information from each of the engine microservers. This aids manager 126 in determining what parts need to be ordered in view of known inventory levels. Customer 128 may include a purchaser of one or more of the engines from factory 111. Thus, a primary concern of customer 128 is when an engine is scheduled to ship from factory 111. The microservers may include software configured to calculate a ship date of an engine and adjust the ship date as different activities occur in factory 111. For example, the ship date may be adjusted if it is determined that a part is not in stock or if assembly in a given work cell takes longer than estimated. FIG. 3 also includes expeditor 130, who, in most cases, is located in factory 111, although it is recognized that expeditor 130 may be at a location remote to factory 111. Expeditor 130 may be a member of the production team for one or more of the work cells in factory 111. One of the responsibilities of expeditor 130 may be to ensure that engine assembly is not stalled due to parts not being in a work cell when needed. Therefore, expeditor 130 may also benefit from being able to access data from multiple work cells or multiple areas of factory 111, as well as information from other databases and tracking systems for factory 111.

In the embodiment shown in FIG. 3, sixth work cell 122 represents a loading/shipping area of factory 111. Trucks 132 and 134 are shown stationed outside the shipping area and truck 136 is shown leaving factory 111. In an exemplary embodiment, truck 136 is transporting at least one assembled engine from factory 111 to customer 128. In other embodiments, the engines may be in route via truck 136 to another assembly facility. In either case, the engines may still be transported on the build stands, and thus, the microservers may still be dedicated to those engines. Once the engines have departed factory 111, data about the engines may still be accessible from the microservers through the global Internet.

Two-way arrows are used in FIG. 3 between work cells 112, 114, 116, 118, 120, and 122 and users 124, 126 128, and 130 to represent two-way wireless communication between the work cells and the users. As described herein, users 124, 126, 128 and 130 may access real-time data from the microservers, as well as communicate data to the microservers. For example, if it is determined that a faulty part has already been installed on the engines, production manager 124 may send a message to all microservers dedicated to engines that include that part. In order to make that determination, manager 124 may run a query on all the microservers to determine which engines include the part. The query may include all microservers within factory 111, as well as microservers in different factories. As another example, if there is a change in the assembly process, one of the process engineers (not shown in FIG. 3) may communicate the change to all of the microservers dedicated to engines that are affected by the change. Simultaneous to the communication, an update to the assembly manuals may also be sent to the microservers.

The microservers of system 110 may also communicate with one another, as represented, for example, by the two-way arrow between first work cell 112 and second work cell 114. Although only one arrow is shown between first work cell 112 and second work cell 114, it is recognized that, so long as a work cell contains a microserver, the microserver in that work cell is able to communicate with microservers of other work cells. Additional arrows between work cells have not been shown in FIG. 3 for clarity. The microservers may be able to communicate with each other locally if they are close enough to one another, otherwise the microservers may communicate through the global Internet.

In the exemplary embodiment described herein, the microserver system is used for managing the assembly of aircraft engines. The microserver system is also well suited for managing a repair of an aircraft engine. An engine stand, like stand 16 of FIGS. 1 and 2, may similarly be used during repair of an engine. When an engine arrives at a repair facility, the engine is placed on a repair cart or stand, which may have a microserver mounted to it. The microserver may contain information specific to that engine model. Instructions may then be sent to that microserver to communicate the details of the particular repair. The repair process may be similar to the assembly process described above in reference to FIG. 2. It may be completed in one or more work cells like work cell 50 of FIG. 2. A three dimensional model of the engine may be stored on the microserver and displayed on plasma screens within the repair work cell. When parts are removed from the engine for repair or replacement, this information may be communicated to the microserver. Similar to the process described above, if a replacement part is added to the engine, the microserver may be updated and then the information may be disseminated from the microserver to other interested users. Repair checklists may also be stored on the microserver and updated directly through the microserver. A repair facility may commonly be repairing multiple engines at one time. As described above in reference to FIG. 3, a microserver system may be used to track the status of multiple engines undergoing repair in one facility.

Engine 12 of FIGS. 1 and 2 is representative of an engine that may be used in an aircraft. During assembly or repair, the engine is carried on some type of support structure, such as an engine stand or cart. After completing an assembly or a repair, the engine may be transported to a facility where the aircraft is assembled. Typically the engine and the aircraft are assembled in different locations; in some cases, the locations may be on other sides of the world. Although larger in size, an aircraft may be similarly assembled on some type of support structure, such as a platform or a rig. During its assembly, the aircraft commonly travels through the assembly facility on the platform or rig. The aircraft may include a microserver, which is carried by the platform or rig and has similar capabilities to the engine microserver described above.

The aircraft microserver and the engine microserver may communicate with one another locally and remotely. Using the global Internet, the two microservers may communicate remotely. For example, the aircraft microserver may send a communication to the engine microserver and/or access data from the engine microserver to determine the status of the engine assembly. This may easily occur even though the assemblies are occurring in locations far apart from one another. In some embodiments, the engine may remain on the build stand until it is time to mount the engine to the aircraft. In that case, the engine would arrive at the aircraft assembly facility on the build stand that contains the engine microserver, along with the second engine. The engine microserver may then communicate locally with the aircraft microserver, as described above using the local wireless system.

Continuing with the aircraft as an example, the aircraft may have multiple components to be assembled onto the aircraft which use a component microserver during the component assembly. In addition to the engines, for example, an auxiliary power unit (APU) for the aircraft may also be assembled at a separate facility and on a build stand having a microserver dedicated to assembly of the APU. The aircraft, which may include, for example, an airplane or a helicopter, is an exemplary embodiment of a large, complex product made up of numerous components that also undergo a complex assembly process. The system described herein allows multiple users to monitor assembly of the aircraft and its various components from a single location even though the assembly is occurring in multiple locations.

The microserver described herein may be used on any type of product that includes multiple components and/or a complex assembly process. The product may include any type of product carried on a support structure during its assembly. The support structure may be any type of movable, stable structure, including, but not limited to, a stand, a cart, a rig, a frame, and a platform. The microserver is well suited for products that move, during assembly or repair, from different stations, different work cells, different buildings or geographic locations. Examples of products that may use the microserver system described herein include, but are not limited to, computers or other complex electronics, vehicles including automobiles and other land vehicles, water vehicles, airplanes, helicopters, and spacecraft. The product also may be a major component of a vehicle, such as an engine. As described above, multiple microservers may communicate locally and remotely with one another throughout assembly of the various components and the main body of the product.

Although the present invention has been described with reference to preferred embodiments, workers skilled in the art will recognize that changes may be made in form and detail without departing from the spirit and scope of the invention.

The invention claimed is:

1. A method of managing a product during assembly or repair of the product, the method comprising:
   supporting the product with a support structure during at least one of an assembly process and a repair process;
   gathering data relevant to the product with a primary microserver carried by the support structure, wherein the primary microserver is configured to function as a local computing workstation and collect, store and process data for the product; and
   providing data from the primary microserver to local and remote computing devices.

2. The method of claim 1 wherein the support structure includes at least one of an engine stand, a vehicle stand, a rig, a cart, a frame and a platform.

3. The method of claim 1 further comprising:
providing information from local and remote computing devices to the primary micro server.

4. The method of claim 3 wherein providing information to the primary microserver is performed by a second microserver located within a work cell of a factory where the product is assembled or repaired.

5. The method of claim 1 further comprising:
transferring at least a portion of the data stored on the primary microserver to at least one of a portal and a second microserver configured to be attached to the product and used during operation of the product.

6. The method of claim 1 further comprising:
monitoring at least one of an assembly process and a repair process for a component of the product using a component microserver carried by a support structure for the component, wherein the primary microserver and the component microserver are configured to communicate locally and remotely with each other.

7. A method of managing a product during assembly or repair of the product, the method comprising:
attaching a microserver to a support structure configured to support and transport the product during assembly or repair of the product, wherein the microserver is configured to function as a local computing workstation and a web data gateway having its own web page and corresponding Internet web address on a world wide web;
gathering data relevant to the product using the microserver;
storing data on the microserver pertaining to at least one of an assembly and a repair of the product; and
tracking status of the product locally and remotely using the microserver.

8. The method of claim 7 wherein data stored on the microserver includes at least one of assembly instructions, repair instructions, a three-dimensional model of the product, supply chain information, and part identification information.

9. The method of claim 7 wherein the product includes at least one of an engine, a land vehicle, an aircraft, a spacecraft, and a water vehicle.

10. The method of claim 7 wherein the support structure includes at least one of an engine stand, a vehicle stand, a rig, a cart, and a platform.

11. The method of claim 7 further comprising:
transferring information to and from the microserver.

12. The method of claim 11 wherein transferring information to and from the microserver is performed by at least one of a local computing device located within a local wireless network around the microserver and a remote computing device using communication means selected from a group consisting of radio frequency, optical, wired, wireless, satellite and cellular.

13. A product management system for a product comprising:
a structure configured to temporarily support and transport the product during at least one of assembly and repair of the product; and
a product microserver configured to attach to the structure and create a local world wide web around the structure, wherein the product microserver is configured to function as a local computing workstation, host a web page having an IP address, and store data about the product.

14. The product management system of claim 13 further comprising:
a second microserver configured to reside inside a work cell and communicate locally with the product microserver when the product microserver enters the work cell.

15. The product management system of claim 13 wherein the structure includes at least one of an engine stand, a vehicle stand, a rig, a cart, a frame and a platform.

16. The product management system of claim 13 wherein the product includes at least one of an engine, a land vehicle, an aircraft, a spacecraft, and a water vehicle.

17. The product management system of claim 13 further comprising:
a portal configured to contain a duplicate copy of data stored on the product microserver.

18. The product management system of claim 13 further comprising:
a component microserver configured to attach to a structure used to support and transport a component of the product during assembly of the component, wherein the product microserver is configured to communicate with the component microserver locally and remotely.

19. The product management system of claim 18 wherein the product is an aircraft and the component is an engine of the aircraft.

20. The product management system of claim 13 wherein the product microserver includes a radio frequency identification (RFID) reader that is used to track RFID tagged parts to be added to the product during assembly or repair.

* * * * *